(12) United States Patent
Khotimsky et al.

(10) Patent No.: US 9,363,013 B2
(45) Date of Patent: Jun. 7, 2016

(54) MITIGATING ROGUE OPTICAL NETWORK UNIT (ONU) BEHAVIOR IN A PASSIVE OPTICAL NETWORK (PON)

(75) Inventors: Denis Andreyevich Khotimsky, Westborough, MA (US); Liquan Yuan, Shanghai (CN); Dezhi Zhang, Shanghai (CN)

(73) Assignee: ZTE Corporation, Shenzhen (CN)

( * ) Notice: Subject to any disclaimer, the term of this patent is extended or adjusted under 35 U.S.C. 154(b) by 175 days.

(21) Appl. No.: 14/111,557

(22) PCT Filed: Apr. 12, 2012

(86) PCT No.: PCT/CN2012/073957
§ 371 (c)(1), (2), (4) Date: Jun. 1, 2014

(87) PCT Pub. No.: WO2012/139516
PCT Pub. Date: Oct. 18, 2012

(65) Prior Publication Data
US 2014/0294385 A1 Oct. 2, 2014

(30) Foreign Application Priority Data
Apr. 13, 2011 (WO) ............... PCT/CN2011/072746

(51) Int. Cl.
*H04B 10/272* (2013.01)
*H04B 10/2507* (2013.01)
(Continued)

(52) U.S. Cl.
CPC .......... *H04B 10/2507* (2013.01); *H04B 10/079* (2013.01); *H04B 10/27* (2013.01);
(Continued)

(58) Field of Classification Search
CPC ............ H04B 10/075; H04B 10/079–10/0799; H04B 10/2507; H04B 10/27–10/2725
USPC ........................ 398/15, 22, 23, 25–38, 58–66
See application file for complete search history.

(56) References Cited

U.S. PATENT DOCUMENTS 8,006,142 B2 * 8/2011 Haran .................. H04B 10/077
714/704
8,582,969 B1 * 11/2013 Sandstrom ........... H04B 10/272
398/17
(Continued)

FOREIGN PATENT DOCUMENTS

CN 101583053 A 11/2009
CN 101820558 A 9/2010
(Continued)

OTHER PUBLICATIONS

ITU-T Telecommunication Standard Sector of ITU, "Rogue optical network unit (ONU) considerations," Series G, Supplement 49, pp. 1-7, Feb. 2011.*
(Continued)

*Primary Examiner* — Li Liu
(74) *Attorney, Agent, or Firm* — Perkins Coie LLP (57) ABSTRACT

Techniques, apparatus and systems are described for an optical line terminal (OLT) operable in a passive optical network (PON) system to isolate and mitigate the behavior of a rogue optical network unit (ONU) that transmits optical power up the optical distribution network (ODN). In one aspect, a method of mitigating the behavior of rogue ONUs can include detecting the presence of a rogue ONU on the PON system, and transmitting, based on the detection, a message addressed exclusively to the ONUs that have not yet been discovered or identified by the OLT.

20 Claims, 10 Drawing Sheets (51) Int. Cl.
*H04B 10/079* (2013.01)
*H04Q 11/00* (2006.01)
*H04B 10/27* (2013.01)

(52) U.S. Cl.
CPC ........ *H04B 10/272* (2013.01); *H04Q 11/0067* (2013.01); *H04Q 2011/0064* (2013.01); *H04Q 2011/0088* (2013.01); *H04Q 2011/0096* (2013.01); *H04Q 2213/1301* (2013.01)

(56) References Cited

U.S. PATENT DOCUMENTS

| | | | | |
|---|---|---|---|---|
| 2006/0093356 A1* | 5/2006 | Vereen | H04L 12/2602 | 398/33 |
| 2006/0198635 A1* | 9/2006 | Emery | H04B 10/0799 | 398/38 |
| 2006/0268759 A1* | 11/2006 | Emery | H04B 10/077 | 370/321 |
| 2007/0140689 A1* | 6/2007 | Haran | H04B 10/0793 | 398/27 |
| 2007/0143645 A1* | 6/2007 | Haran | H04B 10/077 | 714/704 |
| 2007/0201867 A1* | 8/2007 | DeLew | H04B 10/07955 | 398/38 |
| 2007/0230958 A1* | 10/2007 | Jiang | H04B 10/0793 | 398/72 |
| 2007/0274719 A1* | 11/2007 | Ferguson | H04J 3/14 | 398/66 |
| 2008/0056731 A1* | 3/2008 | Weber | H04B 10/0793 | 398/197 |
| 2008/0138064 A1* | 6/2008 | O'Byrne | H04B 10/0793 | 398/25 |
| 2009/0123154 A1* | 5/2009 | Dalton | H04Q 11/0067 | 398/98 |
| 2010/0074614 A1* | 3/2010 | DeLew | H04B 10/272 | 398/17 |
| 2010/0098413 A1* | 4/2010 | Li | H04B 10/0795 | 398/38 |
| 2010/0183295 A1* | 7/2010 | Dalton | H04B 10/0773 | 398/16 |
| 2011/0033180 A1* | 2/2011 | Smith | H04B 10/272 | 398/1 |
| 2011/0076012 A1* | 3/2011 | Na | H04B 10/0799 | 398/23 |
| 2012/0039602 A1* | 2/2012 | Hood | H04Q 11/0067 | 398/38 |

FOREIGN PATENT DOCUMENTS

| | | |
|---|---|---|
| CN | 101826928 A | 9/2010 |
| CN | 101902447 A | 12/2010 |
| CN | 102006118 A | 4/2011 |

OTHER PUBLICATIONS

ITU-T Telecommunication Standard Sector of ITU, 10-Gigabit-capable passive optical networks (XG-PON): Transmission convergence (TC) layer specification, G.987.3, Oct. 2010. Hereinafter, ITU-T G987.*

International Search Report and Written Opinion mailed on Jul. 26, 2012 for International Application No. PCT/CN2012/073957, filed Apr. 12, 2012 (12 pages).

Supplementary European Search Report mailed on Oct. 1, 2014 for European Application No. 12771209.9, filed Nov. 11, 2013 (7 pages).

ITU-T Telecommunication Standard Sector of ITU, "10-Gigabit-capable passive optical networks (XG-PON): Transmission convergence (TC) layer specification," G.987.3, 131 pages, Oct. 2010.

* cited by examiner

| Field | Content |
|---|---|
| Recipient address | A code indicating broadcast message to all ONUs |
| Message type | DISABLE / ENABLE Serial number message |
| Operation code | Conventional (prior art) operation code points:<br>- DISABLE specified serial number<br>- DISABLE all ONUs on the PON<br>- ENABLE specified serial number<br>- ENABLE all previously disabled ONUs<br><br>Extra disclosed operation code points:<br>- DISABLE-DISCOVERY<br>- DISABLE-DISCOVERY-DELAY<br>- DISABLE-DISCOVERY-SPLIT<br>- ENABLE-DISCOVERY<br>- p-ENABLE-DISCOVERY<br>- ENABLE-DISCOVERY-LEVEL |
| Serial number | Specific ONU serial number or DON'T CARE value |
| Protection | Error correction and/or integrity verification code |

MITIGATING ROGUE OPTICAL NETWORK UNIT (ONU) BEHAVIOR IN A PASSIVE OPTICAL NETWORK (PON)

CROSS REFERENCE TO RELATED APPLICATIONS

This application claims priority from International Application Number PCT/CN2011/072746, entitled "MITIGATING ROGUE OPTICAL NETWORK UNIT (ONU) BEHAVIOR IN A PASSIVE OPTICAL NETWORK (PON)," filed on Apr. 13, 2011, the entire content of which is incorporated by reference in the present document.

BACKGROUND

This application relates to systems, devices, and techniques that implement data communications in a passive optical network.

A passive optical network (PON) is an optical network architecture based on point-to-multipoint (P2MP) topology in which a single optical fiber and multiple passive branching points are used to provide data communication services. A PON system can facilitate user access with a service provider communication facility to access telecommunication, information, entertainment, and other resources of the Internet. A PON system can include a central node, called an optical line terminal (OLT), which can be in connection with a single or multiple user nodes called optical network units (ONUS) via a passive optical distribution network (ODN). An OLT can be located at the access provider's communication facility (central office). An ONU can be located at or near the access user's premises.

SUMMARY

Techniques, apparatus and systems are described for allowing a PON system to allow successful mitigation of the rogue behavior, or interference caused by interfering transmissions from an optical network unit (ONU), when the offending ONU can not be identified either by its logical ID or by its serial number.

In one aspect, a disclosed method to facilitate mitigation of rogue behavior of an optical network unit (ONU) includes detecting presence of a rogue ONU on the PON system; and transmitting, based on the detection, a first message addressing only a subset of all ONUs on the PON system.

In another aspect, another disclosed method, implementable at an optical network unit (ONU) in a passive optical network (PON), includes receiving a message over the PON and transitioning, responsive to a state in which the message is received, the ONU to an Emergency stop state in which the ONU refrains from transmitting on the PON.

In yet another aspect, a disclosed system includes a plurality of optical network units (ONUs) and an optical line terminal (OLT) in communication with the plurality of ONUs via an optical distribution network (ODN), the OLT configured to transmit a message to unidentifiable ones of the plurality of ONUs. One of the plurality ONUs is adapted to track whether the ONU has been assigned a logical identification by the OLT in a current activation cycle, and configured to, when determined that the ONU has not being assigned the logical identification, receive and process the message from the OLT.

These, and other novel aspects, are further described below.

DETAILED DESCRIPTION

In the description below, methods, apparatus and system are disclosed that may be useful, in one aspect, to detect and mitigate interference from a rogue transmitter such as an Optical Network Unit (ONU) that has not been assigned a logical identification or has not yet been discovered by the network.

Figure 1:
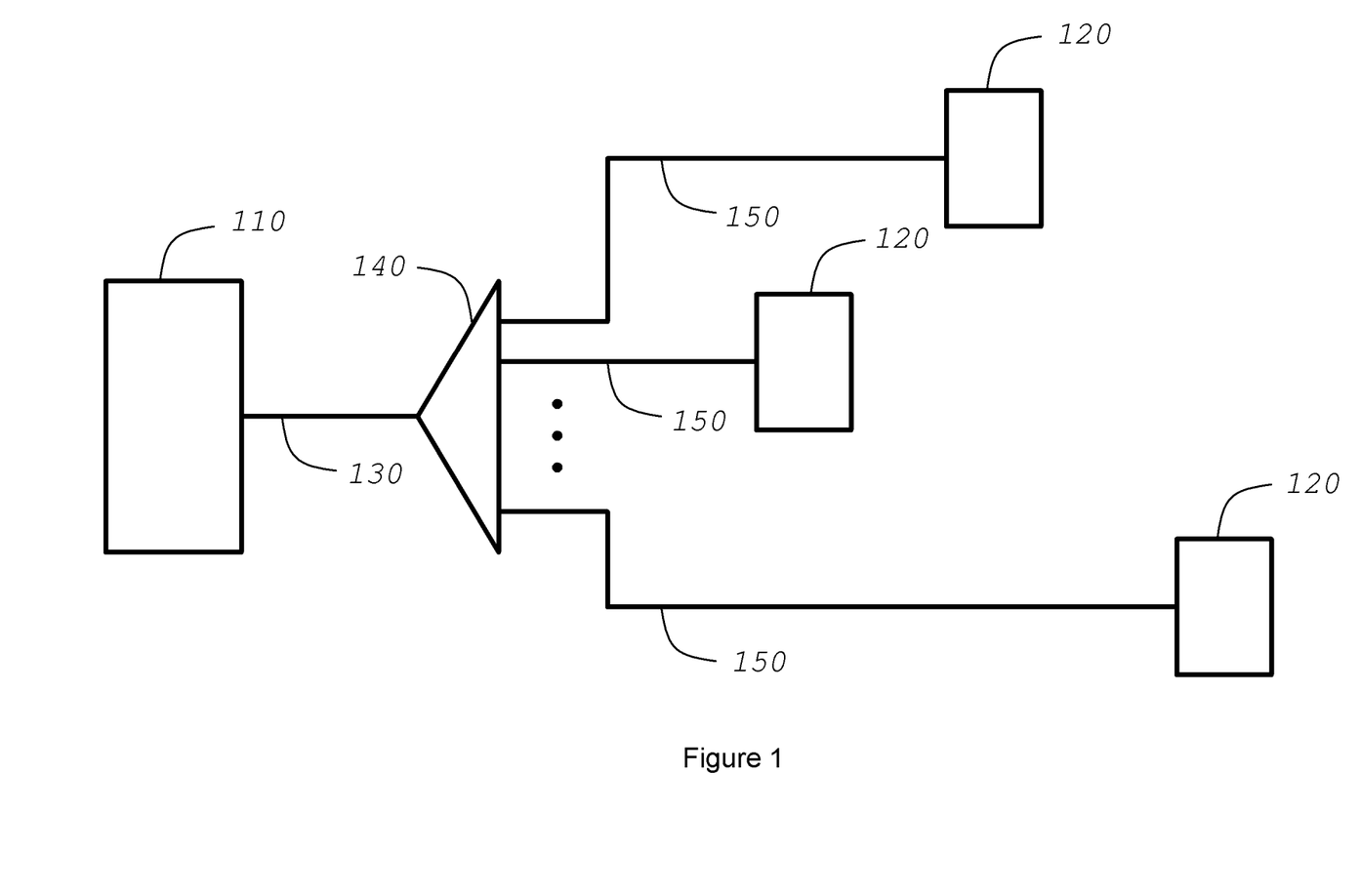
FIG. 1 shows an exemplary PON system showing an OLT 110, multiple ONUs 120; and an ODN that includes optical feeder fiber or trunk fiber 310, splitter 140, and multiple distribution fibers 150.

FIG. 1 shows an exemplary PON system showing an OLT 110, multiple ONUS 120; and an ODN that includes optical feeder fiber or trunk fiber 310, splitter 140, and multiple distribution fibers 150.

A PON system can use optical fiber to connect user premises to a provider communication facility. The PON ODN can include a point-to-multipoint (P2MP) optical fiber infrastructure where passive branching points can be represented by optical splitters are other similar passive optical devices. These passive ODN equipments can be deployed in street cabinets, closets, underground utility holes, cable chambers, and other installations and require no electrical power and little maintenance. The PON ODN can be attached to the OLT with a single strain of optical fiber.

The PON ODN can employ wavelength-division duplex or multiplexing methods to differentiate between downstream (from OLT to users) and upstream (from users to OLT) transmissions, i.e., downstream and upstream optical signals can be carried on different standardized wavelengths. Support of multiple users (ONUS) on the same ODN can be achieved using the methods of time-division multiplexing (TDM) in the downstream direction and time-division multiple access (TDMA) in the upstream direction.

Standard-based PON systems, such as Ethernet PON (EPON), Broadband PON (BPON), Gigabit PON (G-PON), 10 Gigabit/sec EPON (10G-PON), and X Gigabit/sec PON (XG-PON), can be distinguished based on depending on nominal transmission rates, optical layer parameters, and the link layer protocol and formats. These standard-based PON systems can share the TDMA method, which can also share associated vulnerabilities in the TDMA method.

In TDMA techniques, all ONUS attached to their given ODN infrastructure can perform upstream transmission on the same wavelength, which may result in ONU interference with each other, unless the ONUs follow a strict access procedure. For each standard-based PON system, the respective standard can define a multiple access protocol, including procedures and data structures, by which the OLT is able to assign the exact transmission time slots to the individual ONUs. This assignment attempts to prevent interference in upstream transmissions by different ONUs, whereas the appropriate guard time slots serve to accommodate by using the possible transmission time drift.

Figure 2:
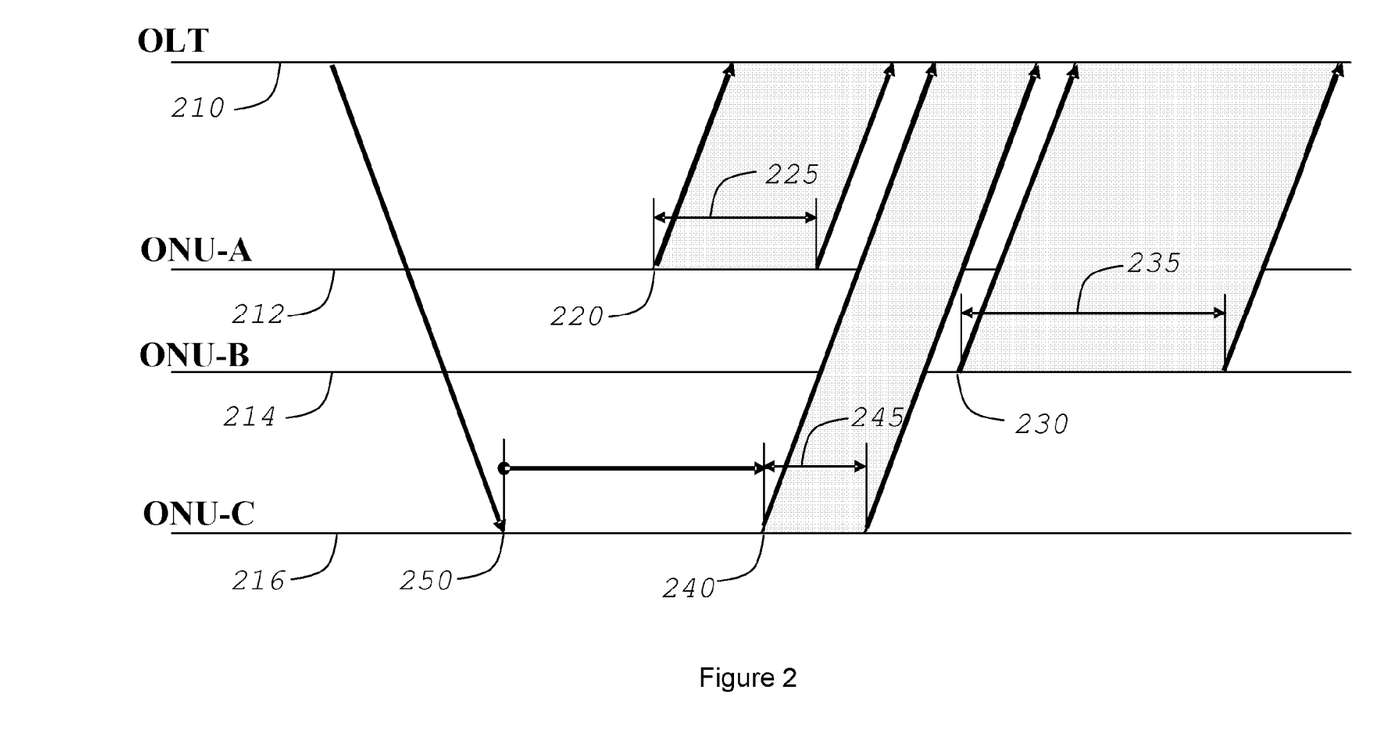
FIG. 2 illustrates an exemplary TDMA method in a PON system showing a timeline of an OLT 210 and timelines of three ONUs: ONU-A 212, ONU-B 214, and ONU-C 216 that exemplify multiple ONUs on a PON system.

FIG. 2 illustrates an exemplary TDMA method showing a timeline of an OLT 210 and timelines of three ONUs: ONU-A 212, ONU-B 214, and ONU-C 216 that exemplify multiple ONUs on a PON system. The OLT 210 can control the start instance 220 and the duration 225 of the upstream transmission burst of ONU-A 212, the start instance 230 and the duration 235 of the upstream transmission burst of ONU-B 214, the start instance 240 and the duration 245 of the upstream transmission burst of ONU-C 216, in such way that all the upstream transmission bursts can be non-overlapping on the timeline of the OLT 210. The PON protocol can allow the OLT 210 to reference each transmission burst of an ONU with respect to a certain event in the timeline of the same ONU. The transmission burst of ONU-C 216 exemplifies behavior and is referenced to the downstream receipt event 250.

Figure 3:
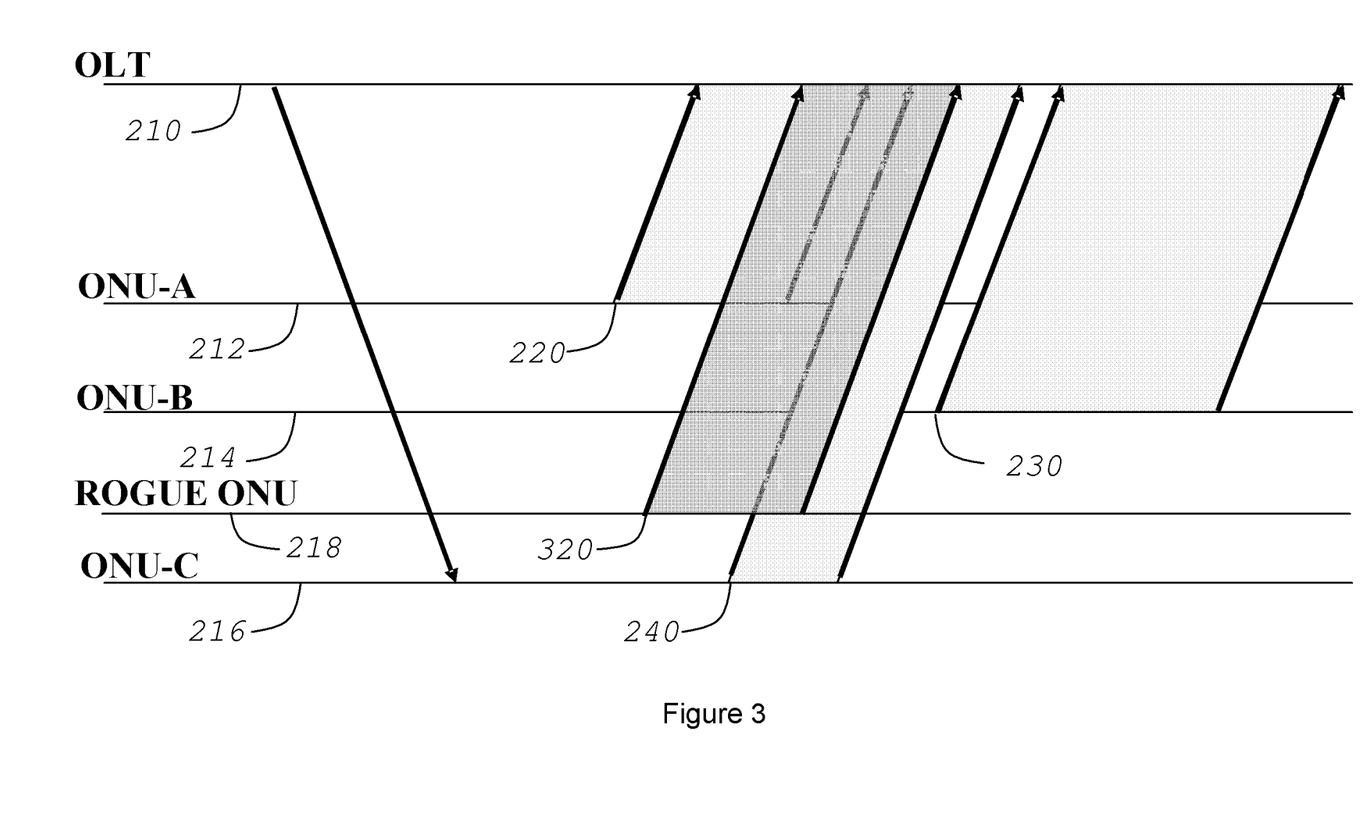
FIG. 3 illustrates an exemplary TDMA method in a PON system with a rogue ONU 218 present showing a timeline of a transmission burst at instance 320.

FIG. 3 illustrates an exemplary TDMA method in a PON system with a rogue ONU 218 present showing a timeline of a transmission burst at instance 320. The transmission burst 320 exhibited by rogue ONU 218 can be transmitted optical power up an ODN in violation of the PON protocol and thereby can cause interference, e.g., the overlapping of transmission bursts from different ONUs on the OLT's timeline.

An ONU that is newly activated or reactivated on the PON first enters a discovery stage of the activation cycle. While at the discovery stage, the ONU declares its presence to the OLT by announcing a globally unique identifier of the ONU (e.g., a serial number, a MAC address etc., depending on the standard) and waits for the assignment of the PON-specific logical ID. Once the OLT assigns the logical ID to the ONU, the ONU enters the ranging stage of the activation cycle. In the ranging stage, the ONU may be requested to perform one or more short upstream transmissions to allow the OLT to accurately measure the roundtrip propagation time and to compute the equalization delay, that is, the extra time the ONU is required to delay its transmission in order to compensate the differences in the roundtrip propagation time between ONUS on the PON. This step might be applicable to some PON types only. Once the individual equalization delay is assigned to the ONU, the ONU enters the regular operation stage and remains in that stage until it is reset by the user or deactivated or disabled by the OLT. If the ONU is power-cycled, reset (or disconnected from the fiber and then reconnected again), or if the OLT deactivates the ONU, the ONU automatically reenters the activation cycle from the discovery stage. If the OLT disables the ONU, the ONU enters the Emergency Stop state, where it is expected to shut down its transmitter, and remains in the Emergency Stop until explicitly enabled by the OLT.

Some standards provide for a DISABLE message that can be addressed to an individual ONU identified by its serial number. Some standards provide for a DISABLE message addressed to all ONUS that are presently allowed upstream access. Similarly, a standardized ENABLE message can be addressed to an individual ONU identified by its serial number, or to all ONUS that have been previously denied upstream access.

In operation, an ONU on a PON system may exhibit behavior that is inconsistent with the standard requirements and can cause interference and disruption of the PON operation. The cause of such behavior from the ONU may be due to design or manufacturing flaws, software or hardware failure, or environmental or other external factors. An ONU that transmits optical power up the ODN in violation of the standard parameters is sometimes called a "rogue ONU". The presence of a rogue ONU on a PON system can cause performance issues and service outages for one or more other ONUS and may ultimately render the entire PON system inoperable.

In some implementations, the OLT can identify the offending ONU at the ranging and regular operation stage by its logical ID. The OLT may retrieve the ONU's serial number associated the logical ID, and to disable the specific ONU addressed by transmitting a DISABLE message based on the given serial number. Thereafter, the OLT can keep the offending ONU in the Emergency Stop state as long as it is necessary to perform all the operational steps that are required to inform the user, and to retrieve, replace, or repair the device. It may be desirable that none of the active ONUS (known by their logical ID and serial number) may exhibit the rogue behavior. If this is the case and the interference persists, the OLT can determine that the rogue behavior is exhibited by an unknown ONU in the discovery stage.

Mitigation of rogue ONU behavior can include diagnosing and isolating the rogue ONU or ONUS. Proper mitigation techniques of rogue ONU behavior are important yet can be difficult to achieve because the affected ONUS are not necessarily the ones that cause the disruption. An event causing an ONU to become rogue may occur at any stage of the ONU activation cycle: discovery, ranging, or operation.

In some implementations, a newly activated or reactivated ONU on the PON declares its presence to the OLT during a special TDMA timeslot during which no active ONU is allowed to transmit. This TDMA timeslot can be referred to as the "quiet window" or "discovery window". During the discovery window, a new ONU can present a unique identification (e.g., serial number of the ONU) and/or other forms of credentials that can allow the OLT to determine the legitimacy of the ONU. If the ONU is determined to be legitimate, then the OLT can allow the ONU to operate on the PON. This phase of ONU activation is commonly referred to as "ONU discovery".

As multiple ONUS may be joining the PON at the same time, the quiet window can be contention-based. Collisions of upstream transmissions during the quiet window may be unavoidable in principle and practice. Therefore PON protocol can provide an effective collision resolution procedure.

Once the OLT accepts the ONU credentials, the OLT assigns the ONU a logical identifier (logical ID) and performs ranging of the ONU. Ranging can determine the exact optical signal propagation time in order for the OLT to perform adequate propagation delay equalization. Once the ONU is ranged and the equalization delay is assigned, the ONU is ready for PON operation. An additional credential verification step may be performed to associate the specific ONU with the pre-provisioned service profile.

If an ONU becomes rogue during the course of ranging or operation, then the OLT can identify and mitigate the rogue ONU behavior. The OLT can identify a suspected rogue ONU by logical ID or a serial number. Once identified, the OLT can either attempt to deactivate the identified ONU (using the logical ID as a handle) or disable the identified ONU (using its serial number as a handle). Deactivation of the ONU can cause the ONU to automatically repeat the activation sequence. Disablement of the ONU can cause the ONU to stop transmission, turn off the transmitter, and wait for explicit instruction to reactivate.

In some implementations, the DEACTIVATE message can be addressed to and is received by the specified ONU. In some implementations, the DISABLE message can be a broadcast message addressed to and received by all ONUS on the PON and processed by only those ONUS whose serial number matches the parameter of the message. Depending on the specific type of standard-based PON system in use, the DISABLE message can pertain to a single specific ONU, to all ONUS that have been previously denied access to the PON, or to all the ONUS on the PON.

Rogue ONU behavior during the Discovery stage of the activation cycle can be most difficult to detect and mitigate. This difficulty can be due to ONUS in the Discovery stage of the activation cycle not being included in the database of known ONUS maintained by the OLT. In this situation, the OLT has no effective identification for the offending ONU and has no finite pool of ONU identities to which the offending ONU may belong. This case of rogue ONU behavior during Discovery stage of the activation cycle may present a serious threat to PON operation.

Techniques, apparatus and system are described that, in some implementations, are useful in mitigating rogue ONU behavior in a PON system to provide the OLT with means to address the DISABLE message exclusively to the ONU or the ONUS in the Discovery stage of the activation cycle. Upon receipt of a DISABLE message, any ONU that has not yet been assigned the PON-specific logical ID can enter the Emergency Stop state. Any ONU that has successfully been assigned the PON-specific logical ID can ignore the Emergency Stop message. It will be appreciated that, in one aspect, this implementation can allow the OLT to take the suspected unknown ONUS out of operation without interrupting the service to the active ONUS.

To mitigate the rogue ONU behavior as described above, an additional code point or additional code points of the operation code parameter of the DISABLE message can be used. In addition, a special value of the serial number parameter of the DISABLE message can be reserved, so that the given message can pertain exclusively to the ONU or the ONUS in the Discovery stage of the activation cycle. The modified DISABLE message can be referred to as the DISABLE-DISCOVERY message. The DISABLE-DISCOVERY message can be carried by any PON management channel, such as PLOAM or embedded management channels of G-PON and XG-PON systems, or MPCP protocol channel of the EPON and 10G-EPON systems. In some implementations, the minimal semantics of the DISABLE-DISCOVERY message can be represented as forcing all ONUS at the Discovery stage into the Emergency Stop state. As such, the DISABLE-DISCOVERY message can also be referred to as the DISABLE-DISCOVERY-STOP message.

In some implementations, the behavior of an ONU in the Emergency Stop state can be invariant to whether it has been forced into the Emergency Stop state by conventional DISABLE message or by DISABLE-DISCOVERY-STOP message. The ONU can be re-enabled and brought back into operation only by an ENABLE message. This is because the ONU's individual serial number has not been determined yet (while in the Discovery stage). To bring the ONU back into operation, the ENABLE message should be addressed to all ONUS that have been previously denied upstream access.

It would be appreciated that the above-discussed techniques can mitigate situations when a single ONU is in the Discovery stage at any given time. However, this may not always be the case. If multiple ONUS are simultaneously going through the Discovery stage of the activation process and some of them are rogue, the legitimate standard-abiding ONUS can be blocked from accessing the PON.

The described techniques can be used to mitigate rogue ONU behavior in a PON system when two or more ONUS in the Discovery stage of the activation process at any given time. To manage this case, the OLT can attempt to probabilistically split the group of unidentifiable ONUS in order to spread their activations in time. The OLT can selectively disable the ONUS among the group that cause disruption operation and can allow the protocol-abiding ONUS to join the PON. The implementation of this exemplary method can be achieved by introducing additional code points of the operation code parameter of the DISABLE message and ENABLE message. The DISABLE-DISCOVERY-SUSPEND message can force all the ONUS in the Discovery stage into the Emergency Stop state; however, these ONUS can remain aware of their Discovery stage status.

For example, in one embodiment, ONUS can process the conventional ENABLE message by generating an independent random value interpreted as a timing parameter or counting parameter, and subsequently using the quiet window to present its credentials to the OLT only after a delay equal to the said timing parameter or after ignoring the number of quiet windows equal to the said counting parameter. In another embodiment, the Discovery-aware ONUS in the Emergency Stop state can process the disclosed p-ENABLE-DISCOVERY message in the following way: each ONU that has been forced into the Emergency Stop state by the DISABLE-DISCOVERY-SUSPEND message independently with probability p returns to the Discovery stage and with probability (1-p) stays in the Emergency Stop state.

In some implementations, rogue ONU behavior in a PON system can be mitigated to allow optimal handling of the multiple ONU in the Discovery stage of the activation process at any given time. To manage this case, Enable Priority Levels can be introduced within the Emergency Stop state for the unidentifiable ONUS and extra code points for the operation code parameter of the DISABLE message and ENABLE message can be defined. Level 0 can correspond to the highest Enable Priority Level, whereas higher level numbers correspond to respectively lower Enable Priority Levels. The DISABLE-DISCOVERY-DELAY message semantics and DISABLE-DISCOVERY-SPLIT message semantics can be defined for the DISABLE-DISCOVERY message, and the ENABLE-DISCOVERY-UP message semantics can be defined for the ENABLE-DISCOVERY message.

Upon receipt of the DISABLE-DISCOVERY-DELAY message, an ONU in the Discovery stage can enter the Emergency Stop state with a randomly generated Enable Priority Level. The highest and the lowest Enable Priority Levels can be either known by convention or specified as a parameter of the DISABLE-DISCOVERY-DELAY message itself. Specifying the highest Enable Priority Level away from Level 0 can allow all ONUS in a group of unidentifiable ONUS a discovery chance not later than the rogue suspect would be given again.

Upon receipt of the DISABLE-DISCOVERY-SPLIT message, an ONU in the Discovery stage can enter the Emergency Stop state in a manner selecting randomly between Enable Priority Level 0 and Level 1, while all of the unidentifiable ONUs already in the Emergency stop state can further lower their Enable Priority Level.

Upon receipt of the ENABLE-DISCOVERY-UP message, each unidentifiable ONU in the Emergency Stop state can raise its Enable Priority Level by one step, while the ONUs with the Enable Priority Level 0 can reenter the Discovery stage of the activation process.

The semantic variants of DISABLE-DISCOVERY and ENABLE-DISCOVERY messages can be carried by any PON management channel, such as PLOAM or embedded management channels of G-PON and XG-PON systems, or MPCP protocol channel of the EPON and 10G-EPON systems.

Figure 4:
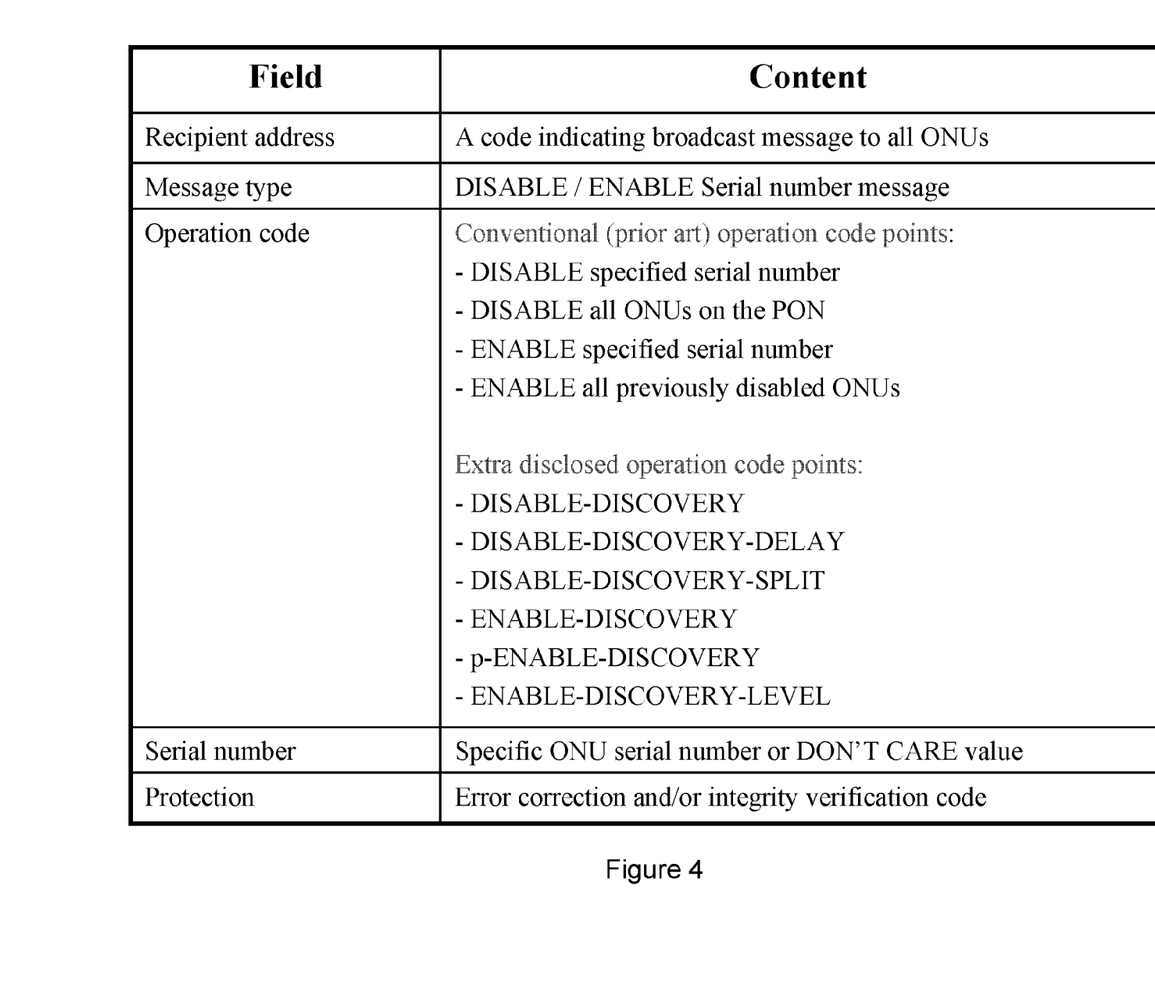
FIG. 4 illustrates an exemplary format of the DISABLE message in a PON system.

FIG. 4 illustrates an exemplary format of the DISABLE message in a PON system. The DISABLE message is a broadcast message that is addressed to and received by all ONUs on the PON, but can be processed only by the ONUs whose serial number matches the parameters of the message. The Operation code field can contain some codepoints of DISABLE and ENABLE as well as extra codepoints of DISABLE-DISCOVERY, DISABLE-DISCOVERY-DELAY, DISABLE-DISCOVERY-SPLIT, ENABLE-DISCOVERY, p-ENABLE-DISCOVERY, and ENABLE-DISCOVERY-LEVEL. The messages of the DISABLE-DISCOVERY and ENABLE-DISCOVERY groups can be processed only by the ONU that have not been discovered and assigned logical ID by the OLT.

Figure 5:
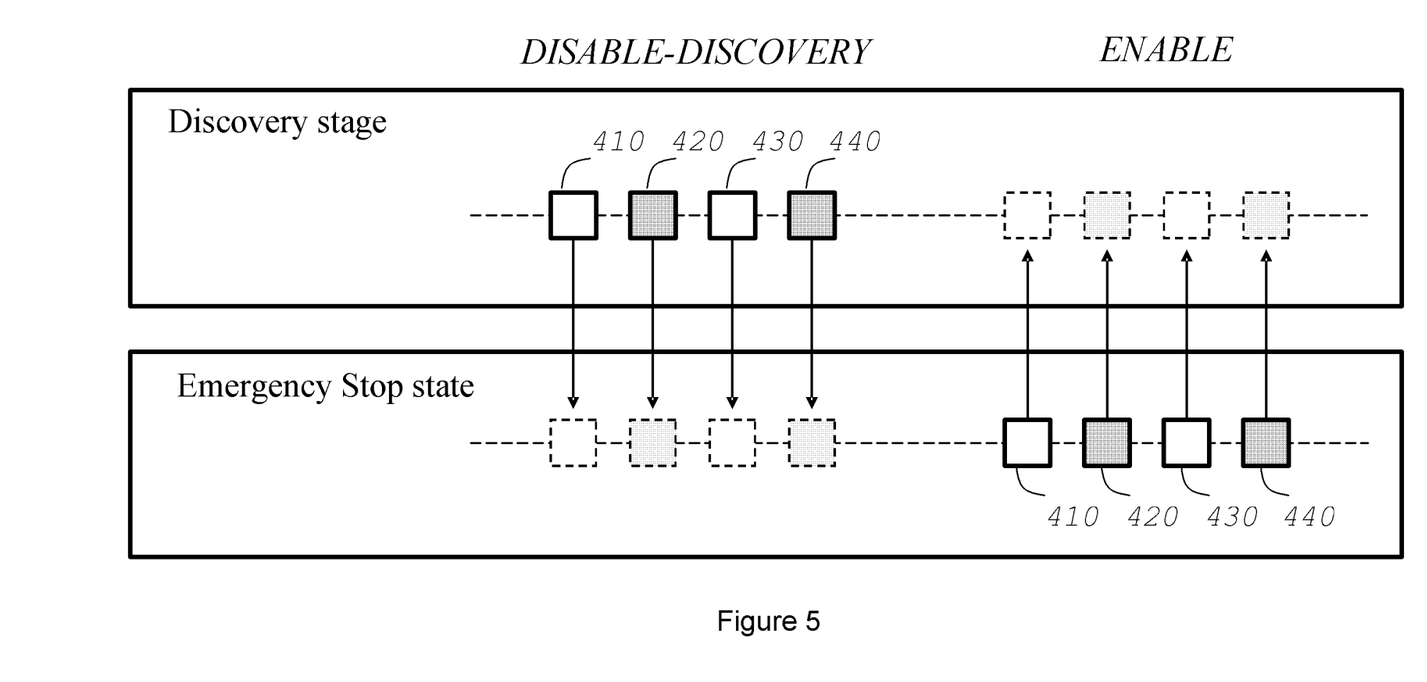
FIG. 5 illustrates an exemplary effect of the messages DISABLE-DISCOVER and ENABLE-DISCOVER on a group of four ONUs 410 420 430 and 440, where ONU 420 and 440 are rogue, that simultaneously can attempt to announce themselves on a PON.

FIG. 5 illustrates an exemplary effect of the messages DISABLE-DISCOVER and ENABLE-DISCOVER on a group of four ONUs 410, 420, 430 and 440 that simultaneously can attempt to announce themselves on a PON. In this example, ONUs 420 and 440 are rogue and cause a collision that results in none of the ONUs becoming successfully discovered. Upon detection of the interference event, the OLT issues a DISABLE-DISCOVERY message, that puts the group of four ONUs 410 420 430 and 440 into the Emergency Stop state. If the OLT later issues an ENABLE message, all four unidentifiable ONUs can reenter the Discovery stage, but may cause interference once again.

Figure 6:
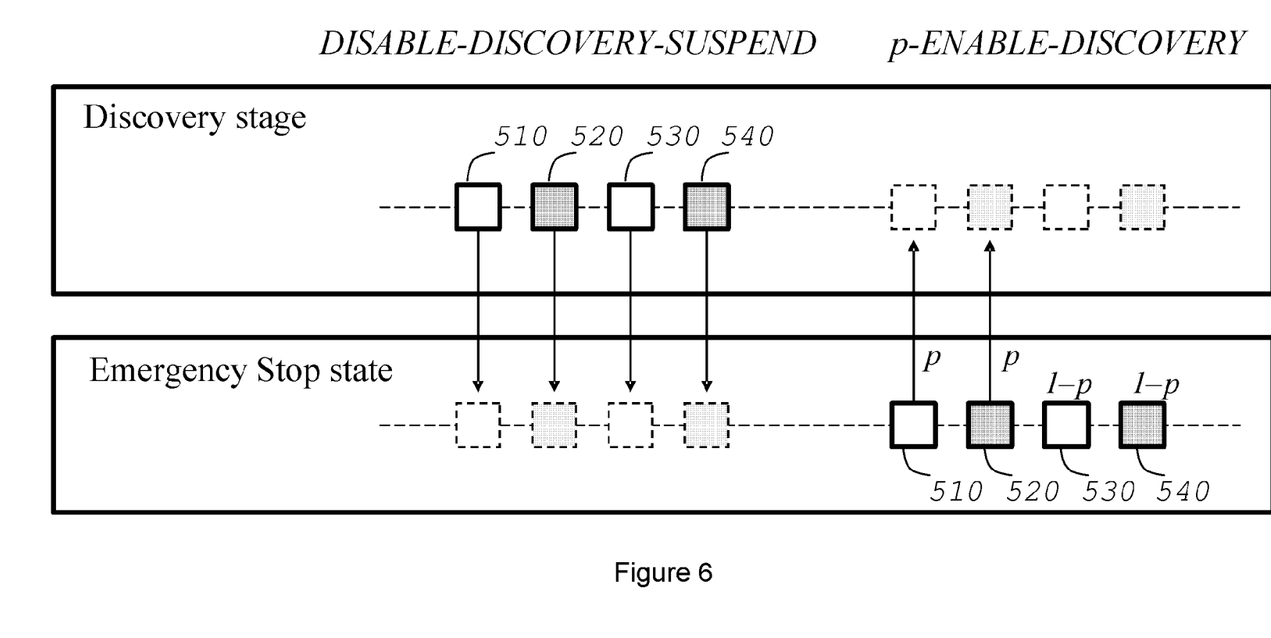
FIG. 6 illustrates an exemplary implementation of the method to mitigate rogue ONU behavior that can employ the probabilistic technique to split a group of unidentifiable ONUs 510 520 530 and 540 with a p-ENABLE-DISCOVERY message.

FIG. 6 illustrates an exemplary implementation of the method to mitigate rogue ONU behavior with the probabilistic technique that can split a group of unidentifiable ONUS 510 520 530 and 540 with a p-ENABLE-DISCOVERY message. Upon receipt of a p-ENABLE-DISCOVERY message, an identifiable ONU in the Emergency Stop state can reenter the Discovery stage with probability p and can remain in the Emergency Stop state with probability (1-p).

Figure 7:
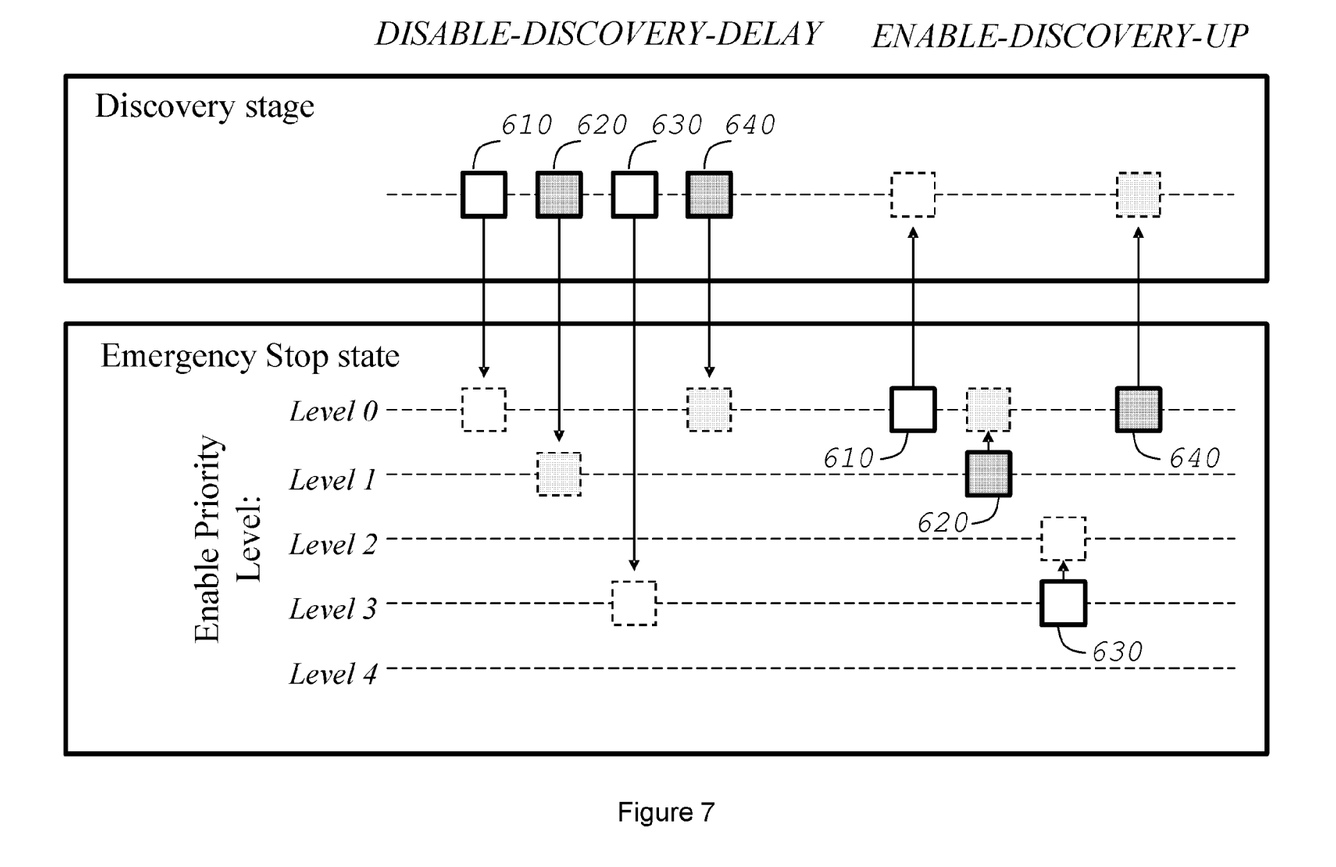
FIG. 7 illustrates another exemplary implementation of the method to mitigate rogue ONU behavior that can employ the DISABLE-DISCOVERY-DELAY message to probabilistically split the group of unidentifiable ONUs 610 620 630 and 640.

FIG. 7 illustrates another exemplary implementation of the method to mitigate rogue ONU behavior that can employ the DISABLE-DISCOVERY-DELAY message to probabilistically split the group of unidentifiable ONUS 610 620 630 and 640. Each unidentifiable ONU in the Emergency Stop state can maintain an Enable Priority Level. Upon receipt of a DISABLE-DISCOVERY-DELAY message, an ONU can select the initial enable priority level randomly and independently from other ONUS. Subsequently, each time an ENABLE-DISCOVERY-UP message is received, the ONU can transition to the next higher priority level. Only an ONU with the highest Enable Priority Level can reenter the Discovery stage.

Figure 8:
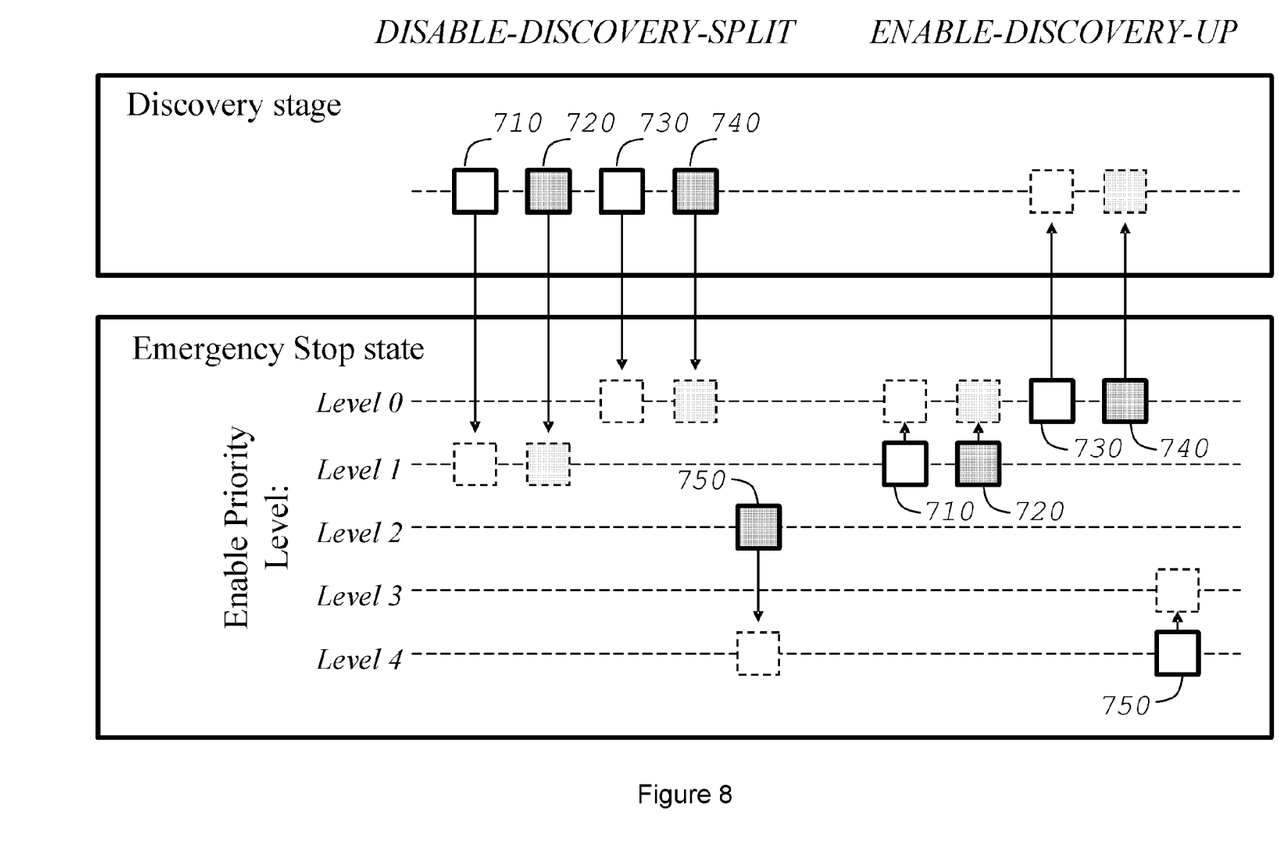
FIG. 8 illustrates another exemplary implementation of the method to mitigate rogue ONU behavior that can employ the DISABLE-DISCOVERY-SPLIT message to probabilistically split the group of unidentifiable ONUs 710 720 730 740 and 750.

FIG. 8 illustrates another exemplary implementation of the method to mitigate rogue ONU behavior that can employ the DISABLE-DISCOVERY-SPLIT message to probabilistically split the group of unidentifiable ONUS 710 720 730 740 and 750. In this example, the ONUS 710 720 730 and 740 (in the Discovery stage) can enter the Emergency Stop state in a manner selecting randomly between Enable Priority Levels 0 and Level 1, while the unidentifiable ONU 750 already in the Emergency Stop state can be further lowered by two levels in Enable Priority Level.

In some implementations, when more than one ONU, rogue or otherwise, attempt discovery at about the same time, a Disable-Discovery message affects all ONUS, including the legitimate ones. If the current protocol mechanisms are followed, these ONUS will likely repeat the discovery attempt also at the same time and, therefore, will be indistinguishable from the OLT perspective. When a rogue ONU is present among the multiple ONUS, the legitimate ONUS will suffer the fate of the rogue ONU, until the rogue ONU is physically taken out of operation. Probabilistic splitting refers to randomization of the time instances the members of the ONU group that have originally attempted discovery at about the same time are forced to repeat the activation attempt. It allows increasing the likelihood that not more than one ONU is attempting to activate within each quiet window.

Figure 9:
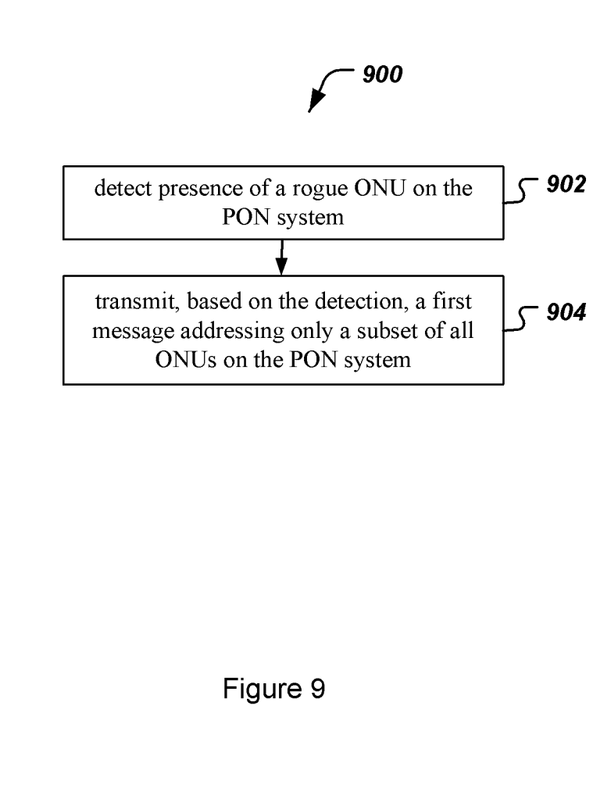
FIG. 9 is a flow chart representation of a procedure, implementable at an optical line terminal (OLT) in a passive optical network (PON) system, to facilitate mitigation of rogue behavior of an optical network unit (ONU).

FIG. 9 is a flow chart representation of a procedure 900, implementable at an optical line terminal (OLT) in a passive optical network (PON) system, to facilitate mitigation of rogue behavior of an optical network unit (ONU). At 902, the presence of a rogue ONU on the PON system is detected. As previously discussed, the presence may be detected based on interference caused by transmissions from the rogue ONU in time slots that are not allocated for transmission to the rogue ONU. At 904, based on the detection, a first message addressing only a subset of ONUs on the PON system is transmitted. As previously discussed, in some implementations, the subset of ONUs includes at least one of a first group of ONUs that have not yet being discovered and a second group of ONUs that are not identifiable.

Figure 10:
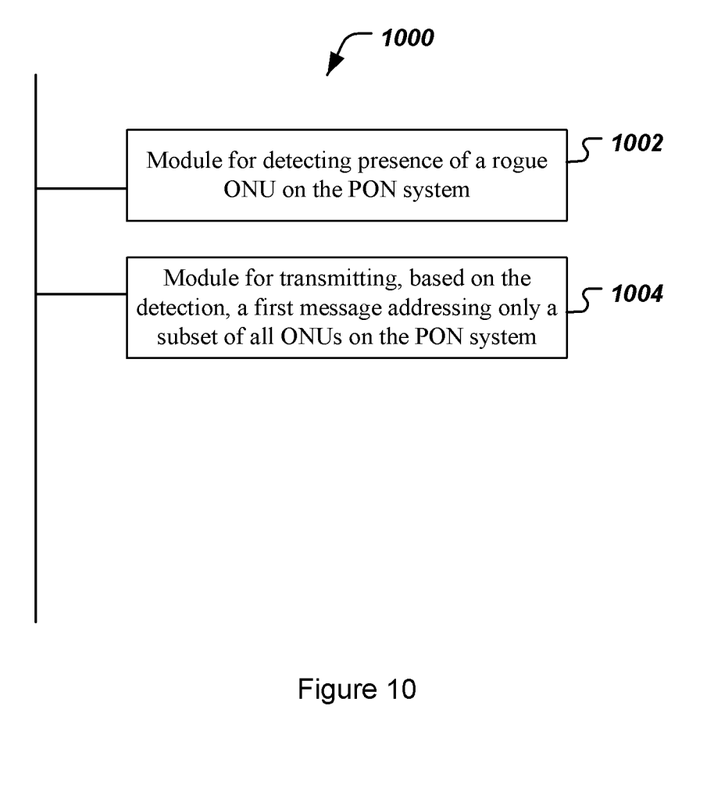
FIG. 10 is a block diagram representation of an apparatus, operable in a passive optical network, to facilitate mitigation of interference from a rogue optical network unit (ONU).

FIG. 10 is a block diagram representation of an apparatus 1000, operable in a passive optical network, to facilitate mitigation of interference from a rogue optical network unit (ONU). The module 1002 for detecting presence of a rogue ONU on the PON system. The module 1004 is for transmitting, based on the detection, a message addressing only a subset of all ONUs on the PON system. The apparatus 1000 and modules 1002, 1004 may be further configured to implement one or more of the techniques disclosed in this document.

Figure 11:
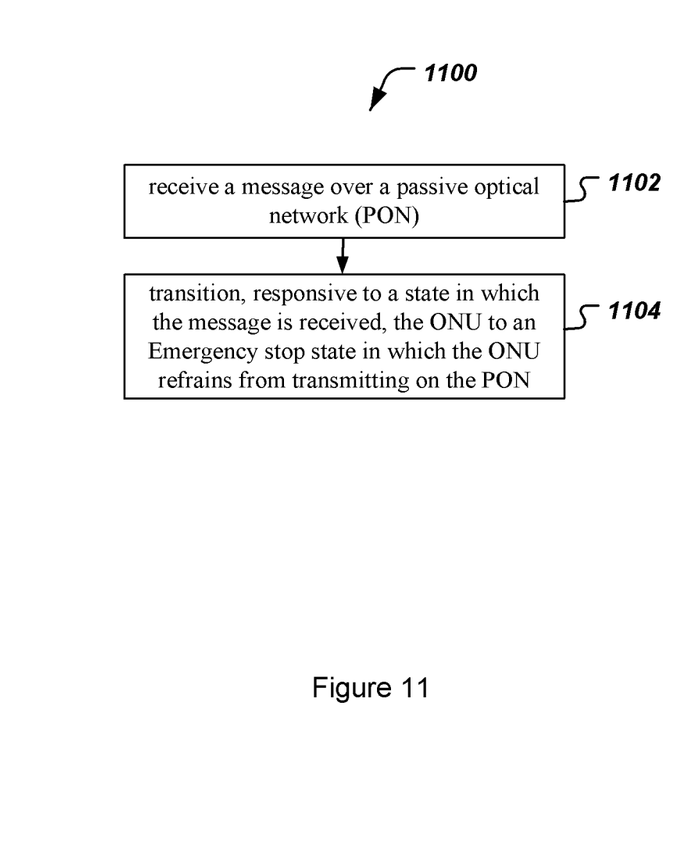
FIG. 11 is a flow chart representation of a procedure implementable at an optical network unit (ONU) in a passive optical network (PON).

FIG. 11 is a flow chart representation of a procedure 1100 implementable at an optical network unit (ONU) in a passive optical network (PON). At 1102, a message is received over the PON. At 1104, responsive to a state in which the message is received, the onu transitions to an Emergency stop state in which the ONU refrains from transmitting on the PON. In some examples, when the message is received, the ONU may be in a state in which the ONY does not have an assigned logical number in the PON.

Figure 12:
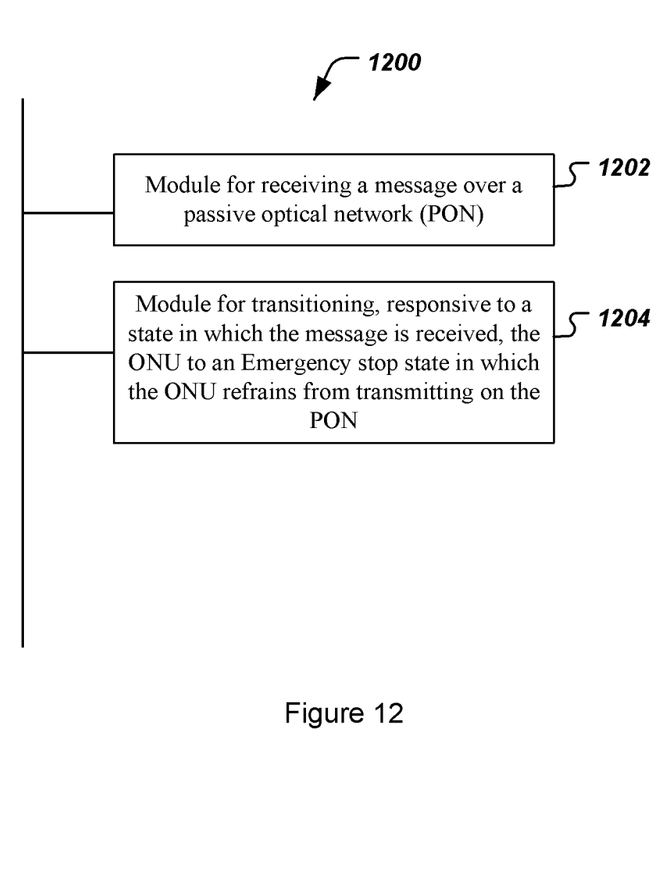
FIG. 12 is a block diagram representation of an apparatus operable in a passive optical network.

FIG. 12 is a block diagram representation of an apparatus 1200 operable in a passive optical network. The module 1202 is for receiving a message over the PON. The module 1204 is for transitioning, responsive to a state in which the message is received, the ONU to an Emergency stop state in which the ONU refrains from transmitting on the PON. The apparatus 1200 and modules 1202, 1204 may be further configured to implement one or more of the techniques disclosed in this document.

It will be appreciated that techniques, apparatus and systems are disclosed to mitigate the interference caused by a rogue ONU in a PON. In one aspect, the ONU is rogue because while the ONU is coupled to the PON, the ONU attempts to transmit in time slots in which it has not been allocated transmission opportunities. In some operational scenarios, the ONU may still be in the process of joining the network and may not have a logical numbers assigned to it.

It will further be appreciated that, a new message is disclosed, which has the effect that, upon receiving the message, an ONU that is still being discovered or is unidentified, transitions to an Emergency Stop state in which it ceases further network transmissions until explicitly receiving permission from the network to begin transmissions.

A few embodiments have been described in detail above, and various modifications are possible. The disclosed subject matter, including the functional operations described in this document, can be implemented in electronic circuitry, computer hardware, firmware, software, or in combinations of them, such as the structural means disclosed in this document and structural equivalents thereof, including potentially a program operable to cause one or more data processing apparatus to perform the operations described (such as a program encoded in a computer-readable medium, which is a non-transitory medium which retains information recorded therein. Examples of such media include, e.g., a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices. The processor and the memory can be supplemented by, or incorporated in, special purpose logic circuitry.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

What is claimed is:

1. A method, implementable at an optical line terminal (OLT) in a passive optical network (PON) system, to facilitate mitigation of rogue behavior of an optical network unit (ONU), the method comprising:
   detecting presence of a rogue ONU on the PON system;
   transmitting, based on the detection, a first message addressing only a subset of all ONUs on the PON system; and
   wherein the subset includes at least one of a first group of ONUs that have not yet being discovered and a second group of ONUs that are not identifiable, the method further including:

probabilistically splitting in time discovery phases of ONUs in the first group of ONUs.

2. The method of claim 1, comprising:
applying a second message that includes semantics for enabling, with random independent delays, ONUs in the second group that are already in the Emergency Stop state.

3. The method of claim 1, comprising:
applying a second message that includes semantics for enabling, independent of each other and with a probability p, ONUs in the second group that are already in the Emergency Stop state, where p is a rational number between 0 and 1.

4. The method of claim 3, comprising:
maintaining an Enable Priority Level for a second ONU in the Emergency Stop state.

5. The method of claim 4, comprising:
applying a third message including semantics to transition ONUs in the second group into Emergency Stop states with independently generated Enable Priority Levels.

6. The method of claim 5, wherein the third message specifies at least one bound of a range of the Enable Priority Levels.

7. The method of claim 5, comprising:
applying a fourth message addressed to the second group of ONUs, wherein the fourth message comprises semantics causing ONUs to transition to the Emergency stop state with Enable Priority Levels selected randomly from a highest priority level (Level 0) and a second highest priority level (Level 1).

8. The method of claim 7, wherein the third message further includes an additional semantics of lowering Enable Priority Levels of ONUs already in the Emergency stop state.

9. The method of claim 8, wherein the fourth message includes semantics of enabling ONUs with a highest priority level.

10. The method of claim 9, wherein the fourth message further includes additional semantics of increasing Enable Priority levels of ONUs that remain in the Emergency Stop state.

11. The method of claim 1, wherein the first message includes bit indication flags in designated positions of overhead fields.

12. The method of claim 1, wherein the first message is included in a multicast Ethernet frame.

13. The method of claim 1, wherein the first message to the second group comprises semantics for transition a first ONU in an Emergency Stop state in which the ONU is to turn off transmitter and is allowed to transmit again only after an explicit permission from the OLT.

14. The method of claim 13, wherein the first message include a broadcast disable message including ONU serial number parameters for the subset of all ONUs.

15. An apparatus, operable in a passive optical network, to facilitate mitigation of interference from a rogue optical network unit (ONU), the apparatus comprising:
a rogue ONU detector that detects presence of a rogue ONU on the PON system; and
a transmitter that transmits, based on the detection, a message addressing only a subset of all ONUs on the PON system;
wherein the subset includes at least one of a first group of ONUs that have not yet being discovered and a second group of ONUs that are not identifiable, the apparatus further including:
a processor that probabilistically splits in time discovery phases of ONUs in the first group of ONUs.

16. The apparatus in claim 15, wherein the subset includes at least one of a first group of ONUs that have not yet being discovered and a second group of ONUs that are not identifiable.

17. The apparatus in claim 15, wherein the message is broadcasted over the PON system.

18. A passive optical network (PON) communication system, comprising:
a plurality of optical network units (ONUs);
an optical line terminal (OLT) in communication with the plurality of ONUs via an optical distribution network (ODN), the OLT configured to detect presence of a rogue ONU on the PON system, transmit a message to unidentifiable ones of the plurality of ONUs, probabilistically split in time discovery phases of the unidentifiable ones of the plurality of ONUs; and
wherein one of the plurality ONUs is adapted to track whether the ONU has been assigned a logical identification by the OLT in a current activation cycle, and configured to, when determined that the ONU has not being assigned the logical identification, receive and process the message from the OLT.

19. The PON communication system of claim 18, wherein downstream communication from the OLT to the plurality of ONUs comprises time-division multiplexing (TDM).

20. The PON communication system of claim 18, wherein upstream communication from the plurality of ONUs to the OLT comprises time-division multiple access (TDMA).

* * * * *